United States Patent
Baldwin et al.

(10) Patent No.: US 6,899,862 B2
(45) Date of Patent: May 31, 2005

(54) METHOD FOR CONTROLLED GENERATION OF HYDROGEN BY DISSOCIATION OF WATER

(75) Inventors: Edward W. Baldwin, Cave Junction, OR (US); Russell P. White, Jr., Lindale, TX (US)

(73) Assignee: Hydrogen Energy America LLC, Henderson, NV (US)

( * ) Notice: Subject to any disclaimer, the term of this patent is extended or adjusted under 35 U.S.C. 154(b) by 146 days.

(21) Appl. No.: 09/905,482

(22) Filed: Jul. 13, 2001

(65) Prior Publication Data

US 2002/0081235 A1 Jun. 27, 2002

Related U.S. Application Data

(60) Provisional application No. 60/217,983, filed on Jul. 13, 2000.

(51) Int. Cl.$^7$ .................................................. C01B 3/08
(52) U.S. Cl. ...................................... 423/657; 423/658
(58) Field of Search .................................. 423/657, 658

(56) References Cited

U.S. PATENT DOCUMENTS

| | | |
|---|---|---|
| 909,536 A | 1/1909 | Brindley |
| 934,036 A | 9/1909 | Brindley |
| 3,346,506 A | 10/1967 | Beumel, Jr. .................. 252/188 |
| 3,674,702 A | 7/1972 | MacKenzie et al. ........ 252/188 |
| 3,786,139 A | 1/1974 | MacKenzie et al. ........ 423/657 |
| 3,895,102 A | 7/1975 | Gallagher .................... 423/657 |
| 3,985,866 A | 10/1976 | Oda et al. .................... 423/657 |
| 4,017,414 A | 4/1977 | Black et al. ................. 252/188 |
| 4,155,172 A | 5/1979 | Bartol |
| 4,155,712 A | 5/1979 | Taschek ...................... 422/239 |
| 4,289,744 A | 9/1981 | Anderson .................... 423/579 |
| 4,308,248 A | 12/1981 | Anderson .................... 423/579 |
| 4,404,170 A | 9/1983 | Caudy et al. ................ 422/237 |
| 4,547,356 A | 10/1985 | Papineau ..................... 423/658 |
| 5,634,341 A | 6/1997 | Klanchar et al. ............. 60/673 |
| 5,867,978 A | 2/1999 | Klanchar et al. ........ 60/39.182 |
| 6,440,385 B1 * | 8/2002 | Chaklader ................... 423/657 |
| 6,506,360 B1 * | 1/2003 | Andersen et al. ........... 423/657 |
| 6,638,493 B2 * | 10/2003 | Andersen et al. |
| 6,800,256 B2 * | 10/2004 | Nelson et al. |
| 2001/0053346 A1 * | 12/2001 | Baldwin et al. |

FOREIGN PATENT DOCUMENTS

| | | | |
|---|---|---|---|
| CA | 2 314 403 | * | 1/2001 |
| CA | 2 414 135 | * | 6/2004 |
| FR | 2 288 548 A | | 5/1976 |
| JP | 56 059601 | | 8/1981 |
| JP | 58055303 | | 4/1983 ............. C01B/3/04 |

OTHER PUBLICATIONS

"The Powerball Concept—Use the Sodium–Water . . . Hydrogen Energy on Demand Without Pressure," http:/www.powerball.net/inside/concept/index.shtml, pp. 1–7, no date.

* cited by examiner

*Primary Examiner*—Wayne A. Langel
(74) *Attorney, Agent, or Firm*—Kilpatrick Stockton, LLP

(57) ABSTRACT

The invention relates to a method and apparatus for controlling the dissociation of water into hydrogen and oxygen, the method including contacting a quantity of aqueous liquid with a quantity of dissociation initiating material in a reaction vessel; monitoring the temperature and/or pressure in the reaction vessel; monitoring the surface area of dissociation initiating material in contact with the aqueous liquid; and controlling the surface area of dissociation initiating material in contact with the aqueous liquid in response to the temperature, pressure, or both, or changes therein, or both, in the reaction vessel.

9 Claims, 8 Drawing Sheets

REACTION RATE
AT DIFFERENT SOLUTION CONCENTRATIONS

REACTION RATE
AT DIFFERENT SOLUTION TEMPERATURES

REACTION RATE
AT DIFFERENT SOLUTION TEMPERATURES

METHOD FOR CONTROLLED GENERATION OF HYDROGEN BY DISSOCIATION OF WATER

This application claims benefit of provisional patent application Ser. No. 60/217,983, filed Jul. 13, 2000, the entire contents of which is incorporated herein by reference.

BACKGROUND OF THE INVENTION

1. Field of Invention

The invention relates to a method and apparatus for generating hydrogen gas in a controlled manner from the dissociation of water. The controlled nature of the method and apparatus allow the production of hydrogen on demand, making the apparatus and process suitable for producing hydrogen for a variety of uses.

2. Description of Related Art

Hydrogen gas can be produced by a number of known chemical reactions. For example, it is known that reacting metals with mineral acids can produce hydrogen and a metallic compound according to the reaction:

Metal+Acid→Metal Compound+Hydrogen Gas

Examples of reactions using zinc and iron with hydrochloric and sulfuric acids are:

$$Zn+2HCl \rightarrow ZnCl_2+H_2\uparrow$$

$$Fe+H_2SO_4 \rightarrow FeSO_4+H_2\uparrow$$

Potassium (K), sodium (Na), calcium (Ca), magnesium (Mg), aluminum (Al), zinc (Zn), iron (Fe), and lead (Pb) are among those metals that will yield hydrogen gas when reacted with dilute mineral acids.

It is also known in the art that alkali metals and alkaline earth metals can react with water to form hydrogen and the corresponding alkali or alkaline earth hydroxide. This reaction, however, is typically rapid and intense, sometimes violent. It generates significant heat, and often the generated hydrogen explodes.

For example, sodium and calcium metals react violently with water to produce heat, release hydrogen and form the metal hydroxide:

$$2Na+2H_2O \rightarrow H_2+2NaOH$$

Certain hydrides such as calcium hydride and sodium boro-hydride react with water to release hydrogen:

$$CaH_2+2H_2O \rightarrow Ca(OH)_2+2H_2\uparrow$$

$$NaBH_4+4H_2O \rightarrow NaB(OH)_4+4H_2\uparrow$$

It is also known that certain alkali metal hydroxides in aqueous solutions will react with metals to form intermediate compounds and release hydrogen gas. Sodium, potassium and lithium hydroxides, etc., will react with aluminum, zinc, silicon iron, lead, etc., to generate heat, release hydrogen gas and form intermediate compounds. In the literature, for example:

$$2Al+2NaOH+6H_2O \rightarrow 2NaAl(OH)_4+3H_2\uparrow$$

$$Si+4NaOH \rightarrow Na_4SiO_4+2H_2\uparrow$$

Almost without exception these reactions are violent and are exothermic in nature, generating significant quantities of heat. The uncontrolled nature of the reactions can elevate the temperature to such a degree that the hydrogen gas generated can ignite, resulting in an explosion.

Numerous closed cycle, often multi-step processes which dissociate water into hydrogen or into hydrogen and oxygen are disclosed in U.S. Pat. Nos. 3,821,358; 3,928,549; 4,011,305, 3,969,495; 3,574,561, 4,182,748; 4,207,095; 4,287,169 and 4,289,744. Of particular interest to this invention are U.S. Pat. Nos. 5,817,157 and 5,782,464 (Checketts), and U.S. Pat. No. 5,690,902 (Werth). The Checketts patents call for a series of coated sodium pellets to be presented on demand to water in a reactor, the coating removed and the sodium allowed to react with the water to form hydrogen and the alkali hydroxide. In order for this scheme to generate sufficient hydrogen for any practical purpose, the sodium pellets would likely have to be of such size as to cause a rapid, intense reaction with the water, along with the generation of significant heat which would raise the temperature of the reaction to the point where spontaneous explosion of the generated hydrogen is possible. Though correct in theory, the Checketts patents fall short of practical application.

The Werth patent calls for the generation of hydrogen from the oxidation of iron particles by water in the presence of what is called a catalyst, potassium hydroxide, at elevated temperatures. In actuality an alkali hydroxide solution will react with the iron to form hydrogen, the alkali metal hydroxide and iron oxide. The potassium hydroxide is not, therefore, a catalyst but is involved in the chemical reaction. As iron oxide is formed on the surface of the iron particles, they become impervious to further action by either the hydroxide or the water, requiring a constant interchange of fresh iron particles, with the majority of the iron being unreacted. Though also correct in basic theory, the Werth patent also falls short of practical applicability.

In order to utilize any, or all, of the possible methods of producing hydrogen gas from the thermo-chemical dissociation of water, it is necessary to control the reaction so that specific volumes of hydrogen gas per unit of time at specific pressures can be delivered for practical utilization. The invention of this application relates to such a control methodology.

SUMMARY OF THE INVENTION

The invention relates to a method and apparatus for controlling the release of hydrogen that can be utilized with any, or all, of the thermo-chemical reactions for the dissociation of water to release hydrogen gas. In a particular embodiment, it can be used with reactions where hydrogen is generated by the combination of aluminum metal, sodium hydroxide and water.

In one embodiment, the invention relates to a method for controlling the dissociation of water into hydrogen and oxygen, by contacting a quantity of aqueous liquid with a quantity of dissociation initiating material in a reaction vessel, monitoring the temperature or pressure or both in the reaction vessel, monitoring the surface area of dissociation initiating material in contact with the aqueous liquid, and controlling the surface area of dissociation initiating material in contact with the aqueous liquid in response to the temperature, pressure, or both, or in response to changes therein, in the reaction vessel. The introduction of the aqueous liquid and the control of the surface area of dissociation initiating material in contact with the aqueous liquid can be accomplished in a number of different ways, explained in more detail below. The nature of the dissociation initiating material and the aqueous liquid may vary, depending upon the particular reaction used to generate hydrogen gas. One suitable combination uses aqueous sodium hydroxide as the aqueous liquid and metallic aluminum as the dissociation initiating material.

In another embodiment, the invention relates to an apparatus for the controlled production of hydrogen by dissociation of water, having:

a reaction vessel having an inlet and an outlet, and adapted to contain a dissociation initiating material;

a solution reservoir in fluid communication with the reaction vessel and comprising a moveable barrier dividing the reservoir into a first compartment and a second compartment;

at least one pressure sensor, at least one temperature sensor, or both, disposed in the reaction vessel;

at least one liquid level sensor disposed in the reaction vessel;

at least one controllable valve disposed between the reaction vessel and the first compartment of the solution reservoir;

at least one controllable valve disposed between the second compartment of the solution reservoir and a source of constant pressure.

The regulation of the surface area of dissociation initiating material in contact with the aqueous liquid allows an exothermic, potentially explosive reaction for the production of hydrogen to be carefully controlled, in effect allowing controlled quantities of hydrogen to be produced on demand. The invention thus provides a process that can be, e.g., carried out on a vehicle that uses the produced hydrogen for fuel, e.g. by combining the hydrogen with air and directly burning it, or by using the hydrogen in a fuel cell.

DETAILED DESCRIPTION OF SPECIFIC EMBODIMENTS

The method and apparatus of the invention can be used with a wide variety of different aqueous liquids, including aqueous solutions of bases, such as alkali metal hydroxides, aqueous solutions of mineral acids, such as sulfuric or hydro-halide acids, and water, provided that the aqueous liquid is capable of reacting with the selected dissociation initiating material to dissociate water in the aqueous liquid. The concentration of the base or acid is substantially variable, and can range from very dilute solutions to very concentrated solutions. Generally, the concentration ranges from about 0.1 M to about 10 M, more particularly from about 4 M to about 10 M for, e.g., aqueous sodium hydroxide. Examples of suitable dissociation initiating materials include aluminum, alloys of sodium and aluminum (such as those described in U.S. patent application Ser. No. 09/885,776, filed Jun. 19, 2001, the entire contents of which is hereby incorporated by reference), iron, zinc, sodium, alkali and alkaline earth metal hydrides, and the like.

The following detailed description, which is meant to be illustrative and not limiting of the appended claims, relates to the reaction of the alkali hydroxides and certain metals to dissociate water. More particularly, the description relates to the reaction between the alkali hydroxide, sodium hydroxide, and aluminum. It will be understood by those of skill in the art that the techniques described below can be applied to other reactive systems of aqueous liquids and dissociation initiating materials, provided that these systems react to dissociate water and release hydrogen.

Though not wishing to be bound by any theory, it is believed that the overall reaction between aqueous sodium hydroxide and aluminum can be summarized as follows:

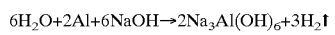

$$6H_2O + 2Al + 6NaOH \rightarrow 2Na_3Al(OH)_6 + 3H_2\uparrow$$

Figure 5:
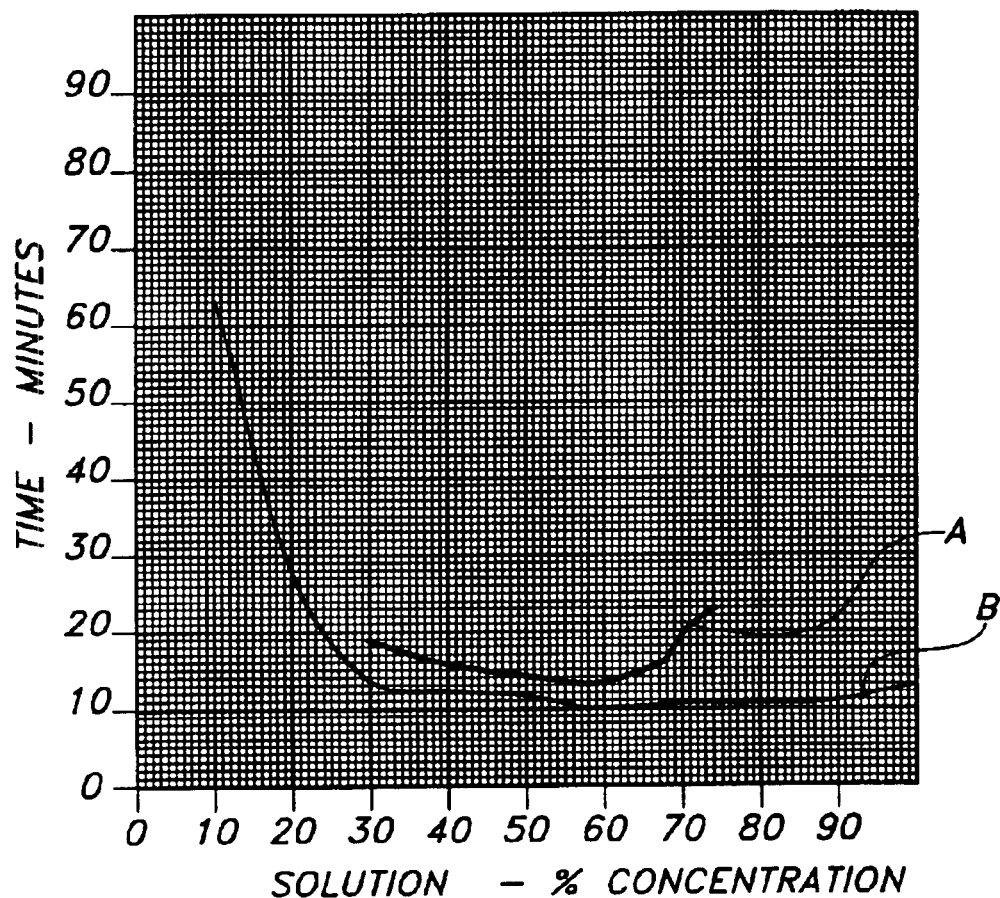
FIG. 5 is a graph showing the variation in the rate of dissociation of water with sodium hydroxide concentration at two different temperatures.

Without wishing to be bound by theory, it is believed, that the actual mechanism by which hydrogen is generated is more complex than is apparent from the overall reaction. Pure aluminum, or any of the commercially available aluminum alloys, when exposed to the atmosphere, will form a thin layer of aluminum oxide on all exposed surfaces of the metal ($Al_2O_3$). It is this oxide film that gives the metal its high corrosion resistance. When immersed in an aqueous liquid of sodium hydroxide (NaOH) the oxide coating reacts with the hydroxide, is converted to the sodium aluminate ($NaAlO_2$) which is soluble in the solution, and is removed from the surface of the aluminum metal. The pure aluminum metal is then exposed to and reacts with the available water to form the oxide or hydroxide of aluminum with the release of hydrogen gas. The rate of the reaction will vary according to the concentration of the sodium hydroxide solution. This is shown in FIG. 5, which is a graph showing how reaction rate varies with sodium hydroxide concentration at 70° F. (line A) and at 64.78° F. (line B).

Figure 6:
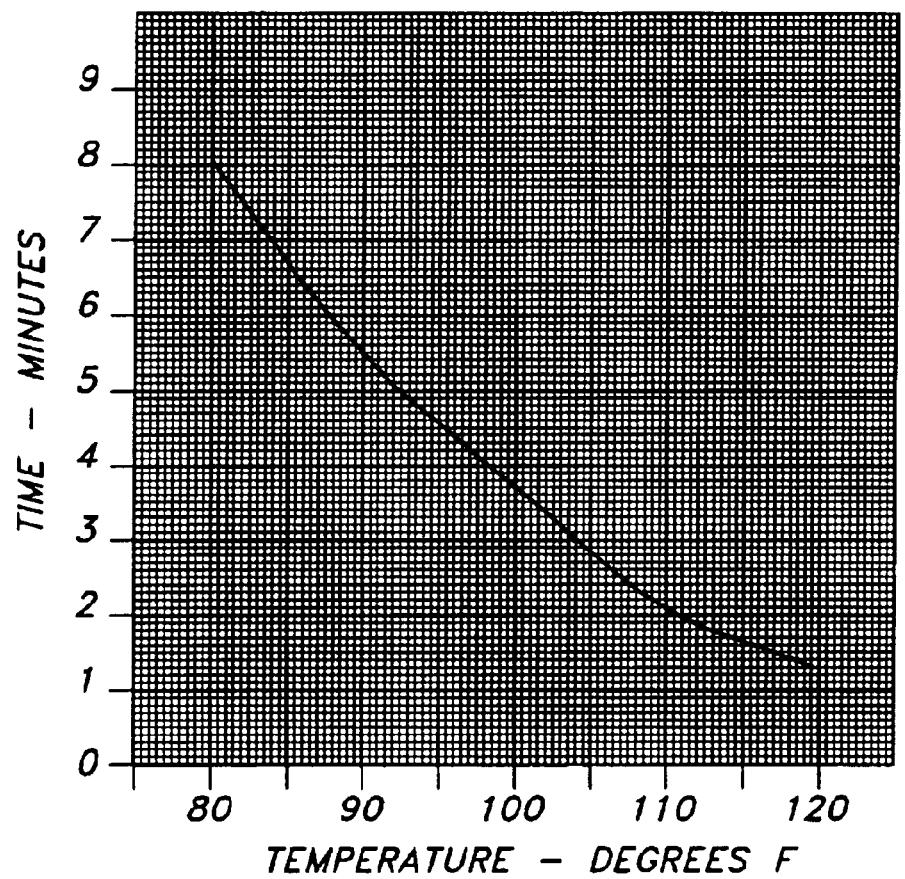
FIG. 6 is a graph showing the variation in the rate of dissociation of water with temperature at a particular sodium hydroxide concentration.
Figure 7:
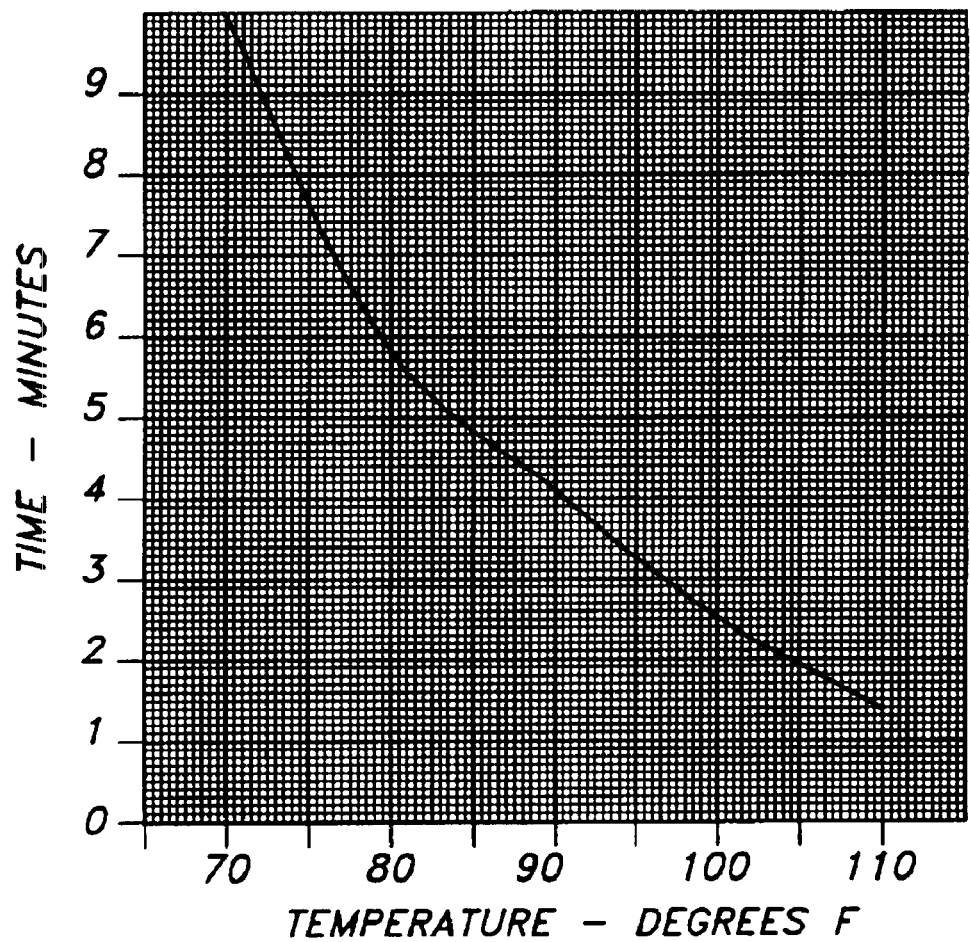
FIG. 7 is a graph showing the variation in the rate of dissociation of water with temperature at a sodium hydroxide concentration different from that shown in FIG. 6.

Reaction rate also varies with the temperature of the system, as shown in FIG. 6 (showing how reaction rate varies with temperature for a 40 wt % solution of sodium hydroxide) and FIG. 7 (showing how reaction rate varies with temperature for a 60 wt % solution of sodium hydroxide). Reaction rate will vary with the surface area of the aluminum exposed to the solution, which is used in this invention to control reaction rate, and with the pressure to which the reactants are submitted. Taking these parameters into consideration, the following methodology was developed to achieve the goal of generating specific volumes of hydrogen gas per unit of time at specific pressures without the input of external power.

Figure 1:
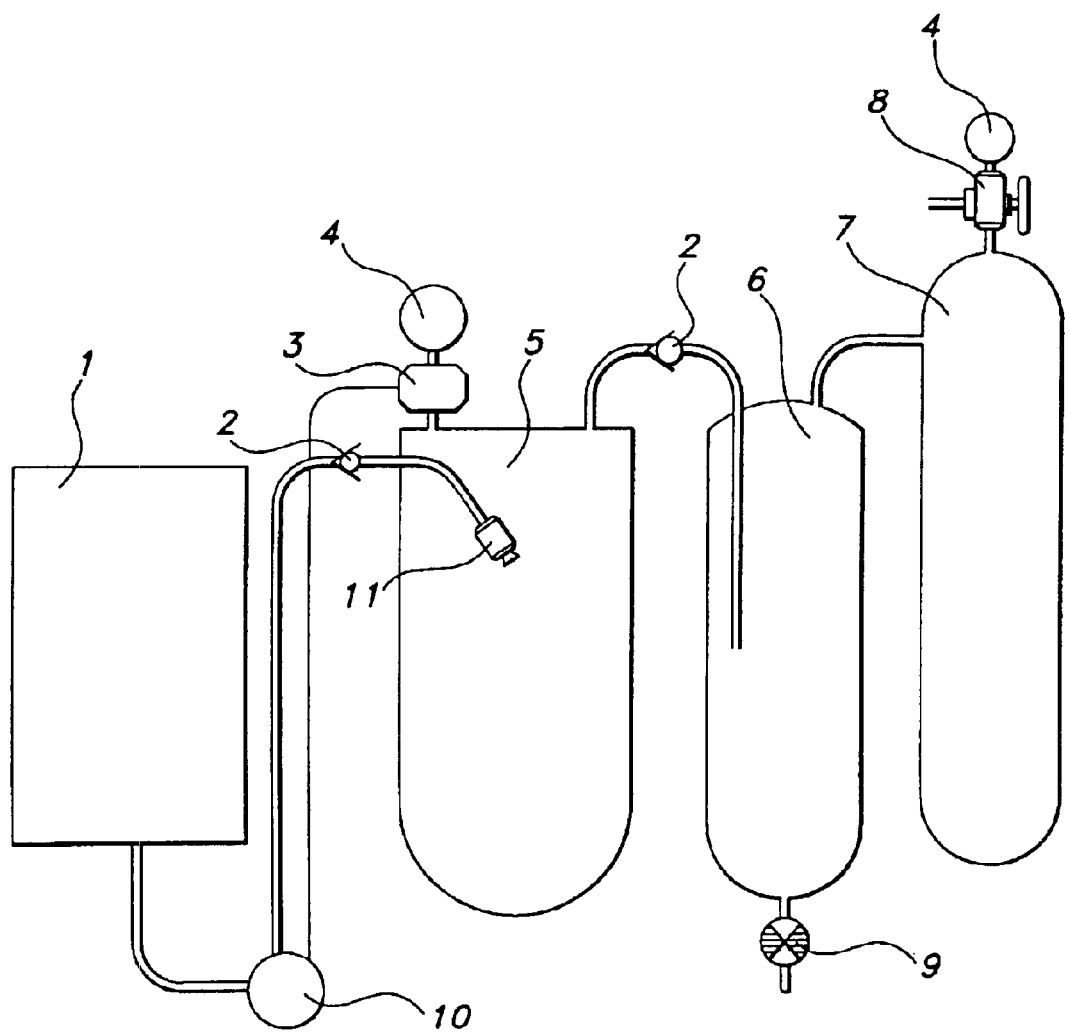
FIG. 1 is a schematic diagram of an apparatus and process of an embodiment of the invention using a spray nozzle to introduce aqueous liquid to the reaction vessel.

In one embodiment of the invention, schematically illustrated in FIG. 1, the dissociation reaction can be controlled by regulating the amount of aqueous liquid sprayed onto metallic aluminum. In this embodiment, a stoichiometric quantity of sodium hydroxide powder and aluminum pellets or nuggets are mixed and placed into a reactor. The use of larger sized aluminum pellets is generally preferred to aluminum powder in order to allow greater control over the reaction. Though a larger surface area provided by an aluminum powder would create a faster reaction, this may often be undesirable as it is too intense, generates too much heat, and increases the risk of explosion of the generated hydrogen. Once the reactants are placed into the reactor and the reactor is sealed, water from a storage tank is pumped into the reactor and onto the reactants through a spray nozzle. The water reacts with the sodium hydroxide to form a solution of the alkali hydroxide. The sodium hydroxide solution is believed to react with the aluminum to form hydrogen gas and the sodium-aluminum hydroxide. The reaction is exothermic and heats the solution within the reactor. The formed sodium-aluminum hydroxide is soluble in a hot alkali solution. Thus, it dissolves in the solution and is removed from the surface of the remaining aluminum, making it available for further reaction. This overcomes the limitations resulting from the formation of iron oxide on the iron particles, which would occur in the Werth patent described above.

When the pressure within the reactor reaches a predetermined level, a pressure switch turns off the water pump. The remaining water continues to react with the sodium hydroxide until there is no further water to react. When the pressure falls below the predetermined level, additional water is pumped into the reactor and the reaction resumes. Hydrogen gas, at the predetermined pressure, passes through a check valve into a condenser where the moisture is condensed out. It then passes through a check valve into a storage tank from which it is regulated for external use. The overall pressure of the system is determined by the frequency and duration of the presentation of water to the reactor by the water pump, which is controlled by the pressure switch set at the desired, predetermined pressure.

In a specific aspect of this embodiment, illustrated in FIG. 1, a stoichiometric ratio of aluminum to sodium hydroxide (1:5.13) is placed into the reactor (5), and the reactor is sealed. The pressure switch (3) is set to the predetermined desirable pressure, for example, around 75 psig. The system is activated and the water pump (10), activated by the pressure switch (3), pumps water from the water storage tank (1) through the spray nozzle (11), and onto the mixed reactants in the reactor (5). The water dissolves the sodium hydroxide powder forming a solution of sodium hydroxide. The sodium hydroxide solution reacts with the aluminum to form hydrogen gas and the sodium-aluminum hydroxide. The reaction continues until the set predetermined pressure causes the pressure switch (3) to actuate, thus turning off the water pump (10) and stopping the flow of water. The solution within the reactor (5) will continue to dissociate water and form hydrogen for a short period until the water in contact with the aluminum is consumed. The generated hydrogen gas, under pressure, flows from the reactor (5) through the check valve (2) into the condenser (6). The other check valve (2) prevents the pressure from forcing gas into the water storage tank (1). In the condenser (6), water is condensed out of the generated hydrogen gas which then passes into the storage tank (7) for eventual use. The stored higher pressure hydrogen is made available through a pressure regulator (8) for distribution to the end use application. The pressure gauges (4) indicate the pressures in both the reactor (5) and the storage tank (7). Condensed water is periodically drained from the condenser (6) through the valve (9).

The primary advantages of this embodiment of the invention are that the reaction between the sodium hydroxide and aluminum is controlled both by the size of the aluminum pellets and the controlled, intermittent introduction of water to the system. By having a controllable pre-set pressure demand water delivery which delivers water in a fine spray onto the hydroxide-aluminum mixture, the rate of reaction can be controlled. The entire quantity of aluminum placed into the reactor can be reacted by a stoichiometric quantity of sodium hydroxide.

Figure 2:
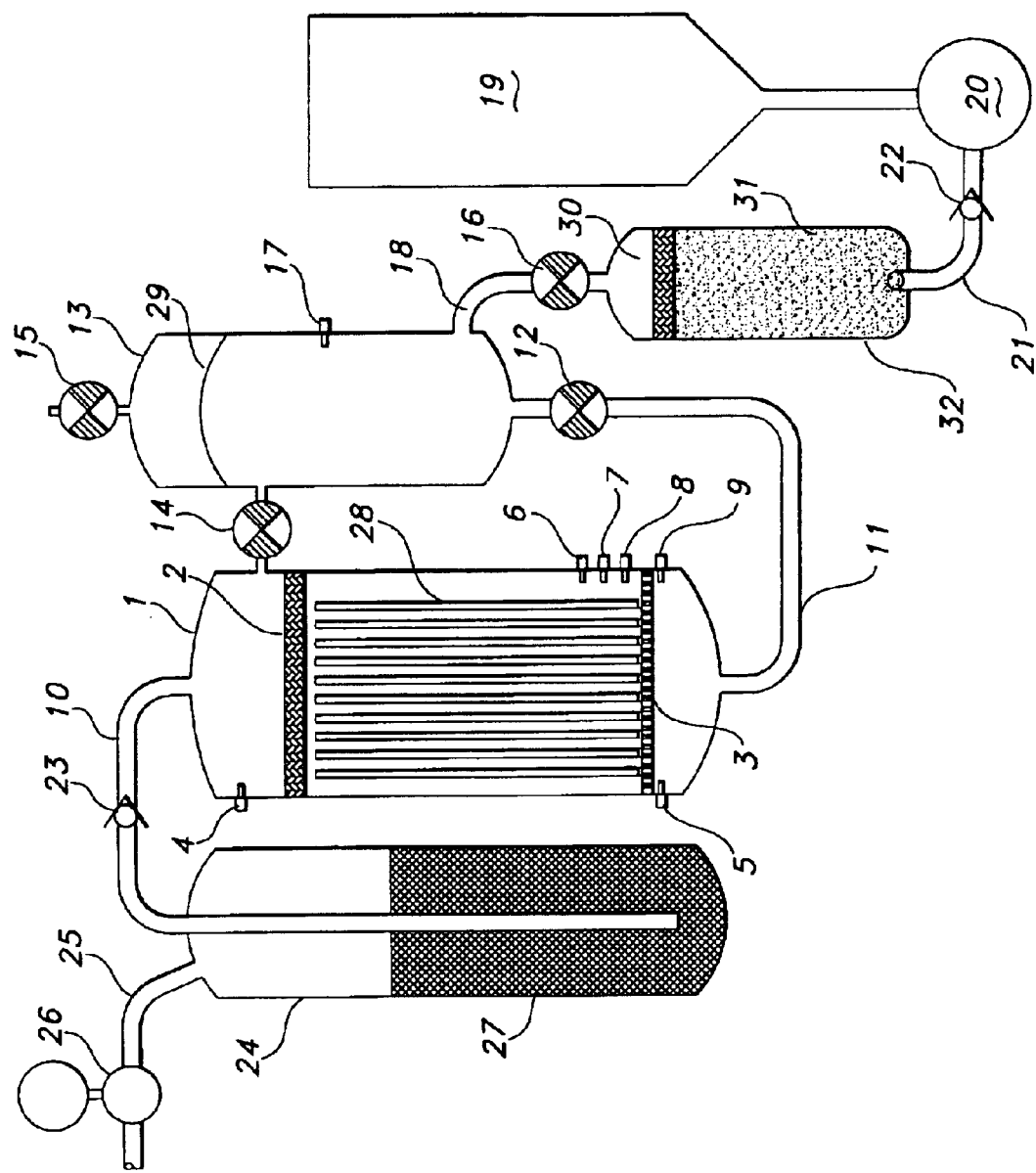
FIG. 2 is a schematic diagram of an apparatus and process of another embodiment of the invention using pressure in the reaction vessel to regulate the level of aqueous liquid.

In another embodiment of the invention, the pressure in the reaction vessel can be used to regulate the surface area of dissociation initiating material in contact with aqueous liquid by directly forcing variation in the level of sodium hydroxide solution in contact with aluminum. Referring to FIG. 2, the apparatus used in this embodiment of the invention contains a reaction vessel (1), a solution reservoir (13), a chemical container (32), a metering pump (20), a water tank (19), a condenser (24), and an output pressure regulator (26). It will be understood that not all of these elements are necessary for the apparatus to produce hydrogen in a controlled manner; that some of the elements are optional, and others are necessary or desirable only for start-up of the dissociation process or for particular applications.

The reaction vessel (1) is shown as a cylindrical pressure vessel closed on both ends, although other configurations may also be used as long as they are capable of receiving aqueous liquid, emitting gaseous hydrogen, and resisting pressure. The reactor is fitted with a porous sintered metal filter element (2) at the top and a perforated plate (3) at the bottom. The sintered metal filter element (2) allows the generated gas to pass and tends to retard the passage of any liquid or solid particles. The perforated plate (3) serves as a support for the aluminum (23) and allows solution to pass to and from the lower plenum area of the reactor (1) into and out of the reaction area. A pressure transducer (4) is fitted in the top plenum area. A temperature sensor (5) is fitted in the lower plenum area. Liquid level sensors (6,7,8) are fitted in the reaction area at specific spaced intervals, and a fourth liquid level sensor (9) is fitted in the lower plenum area just beneath the perforated plate (3). The reactor is in fluid communication with the condenser (24) through external piping (10), and with the solution reservoir (13) through external piping (11) and a solenoid valve (12). It is also in fluid communication with the solution reservoir through external piping and solenoid valve (14).

The solution reservoir (13) is illustrated as a cylindrical pressure vessel, although other pressure vessel configurations could be used. It is fitted with moveable barrier, such as a flexible diaphragm (29), that separates the interior of the vessel into a first and second compartment. The second compartment connects to the atmosphere through external piping and solenoid valve (15). It is understood that this moveable barrier could also be a flexible bellows or a moveable piston, or any conventional device that allows for expansion and contraction of the two areas. The solution reservoir is in fluid communication at the top and bottom of the first compartment with the reaction vessel through external piping and solenoid valves (12,14), and to the chemical container (32) through external piping (18) and solenoid valve (16).

The chemical container (32) is shown as a cylindrical pressure vessel fitted with a porous sintered metal filter element (30) at the top, and connected to the metering pump (20) through external piping (21). The lower portion of the chemical container is filled with sodium hydroxide pellets (31). The metering pump (20) is connected to the water tank (19). The condenser (24) is a cylindrical pressure vessel connected to the reactor through external piping (10) which extends almost to the bottom of the condenser. It is connected to the pressure regulator (26) output through external piping (25). The lower half of the condenser (24) is filled with a dilute solution of sodium hydroxide (27). Again, other configurations may be used.

Check valves (22) and (23) prevent the back flow of gas or liquid from the condenser (24) to the reaction vessel (1) or from the solution reservoir (13) through the chemical container (32) to the metering pump (20).

The pressure transducer (4), temperature sensor (5), and liquid level sensors (6,7,8,9,17) are electrically connected externally (not shown) to a programmed controller (not shown) that translates their input signals to various output relays that operate the solenoid valves (12,14,15,16).

To load the system in preparation for operation, aluminum metal is placed in the reaction area of the reaction vessel (1). As illustrated, the dissociation initiation material is aluminum, more particularly, a multiplicity of aluminum plates (28) arranged vertically and spaced so as to allow the solution to reach all exposed surfaces and to allow space for the generated hydrogen gas to rise to the top of the reactor. It is understood that the aluminum could be plates, tubes, bars, blocks, spiraled sheet, pellets or any other form and configuration depending on the desired application and the level of hydrogen production and control desired. The bottom of the chemical container (32) is filled with sodium hydroxide pellets or powder (31). With solenoid valves (15) and (16) open, connecting the second compartment above the diaphragm (29) to the atmosphere, a concentrated aqueous solution of sodium hydroxide is pumped, from an exterior mixing source, through the chemical container into the solution reservoir (13) to a predetermined level in the first compartment as sensed by the liquid level sensor (17). Valves (15 and 16) are then closed. The metering pump (20) is connected to the water tank (19), which is then filled with water, and the system is ready for operation.

To initiate operation solenoid valves (12) and (15) are opened. The slight pressure built between the liquid and the diaphragm (29) when the reservoir was filled will start forcing the solution through solenoid valve (12) into the reactor (1). When the liquid level reaches liquid level sensor (9) solenoid valve (15) is closed and solenoid valve (14) is opened, equalizing the pressure in both the reactor (1) and the solution reservoir (13). The remaining liquid flows by gravity to a pre-determined level as sensed by liquid level sensor (6), at which point solenoid valve (12) is closed.

When the solution contacts the aluminum plates (28) the reaction begins to occur. The thin oxide film on the aluminum is removed and the aluminum reacts with the water to form the oxide and hydroxide and hydrogen gas is released. As pressure builds within the reaction vessel (1), the gas flows through external piping (10) into the condenser (24) where it bubbles up through the dilute sodium hydroxide solution (27) and is contained in the condenser (24). The pressure in the reactor (1) and the condenser (24) at this point will be equalized.

When the pressure in the reactor (1) reaches a pre-determined level as sensed by the pressure transducer (4), solenoid valve (14) is closed and solenoid valves (12) and (15) are opened. The pressure level necessary to actuate the solenoid valves will be dependent on the volume of hydrogen gas required by the end-use application, the volume of the reactor, the volume of the storage vessel, and other factors, and can be determined through routine experimentation. It is anticipated that this pressure would not exceed 250 psig for most end-use applications.

The opening of the solenoid valves allows the diaphragm (29) to expand resulting in a lower pressure in the solution reservoir (13). Pressure in the reaction vessel (1) forces the solution through external piping (11) into the solution reservoir. When the level of fluid in the reaction vessel (1) reaches the level sensed by liquid level sensor (9) solenoid valve (12) is closed. If the liquid level in the solution reservoir (13) has not reached the level of liquid level sensor (17), the metering pump (20) is turned on, solenoid valve (16) is opened, and water from the water tank (19) is pumped through the sodium hydroxide (31) in the chemical container (32) until it reaches the level of liquid level sensor (17), at which time the metering pump (20) is turned off and solenoid valve (16) is closed. As the water passes through the sodium hydroxide (31) in the chemical container (32), it dissolves sodium hydroxide, thus maintaining the working aqueous solution at concentration.

At this point the apparatus is dormant and a specific quantity of hydrogen gas, at specific pressure, is contained in the reaction vessel (1) and the condenser (24) and is available for release through the pressure regulator (26) to the application.

When the pressure regulator (26) is opened it delivers hydrogen gas to the application at a specific lower pressure and a specific volumetric rate. As gas is released from the condenser (24) through the pressure regulator (26), the pressure in the condenser drops proportionately. As the pressure in the condenser (24) drops, the higher pressure in the reactor (1) causes hydrogen gas to flow through the external piping (10) into the condenser (24), thus also lowering the pressure in the reaction vessel (1). When the pressure in the reactor reaches a pre-determined lower level as sensed by the pressure transducer (4), solenoid valves (12) and (15) are opened and solenoid valve (14) is closed, allowing solution to flow from the solution reservoir (13) through the external piping (11) into the reaction vessel (1). When the solution level in the reaction vessel reaches the level of liquid level sensor (9), solenoid valve (15) is closed and solenoid valve (14) is opened, allowing the solution to flow from the solution reservoir (13) into the reaction vessel (1). When the solution reaches the level as sensed by liquid level sensor (6), solenoid valve (12) is closed. As the solution contacts the aluminum plates (28), the reaction begins again, and additional hydrogen gas is generated.

The apparatus is generally sized to fit the particular application that will consume the hydrogen, so that the surface area of aluminum (28) presented to the concentrated sodium hydroxide solution will generate hydrogen gas at a slightly greater rate than is required for the application. Because the pressure regulator (26) is delivering hydrogen gas to the application at a slightly lower rate than it is being generated by the pre-determined surface area of the aluminum (28), pressure in the reaction vessel (1) and the condenser (24) will slowly increase. If the pressure in the reaction vessel (1) and the condenser (24) reach the pre-determined pressure level as sensed by the pressure transducer (4), the cycle described above will be repeated. However, as gas is being released from the condenser (24) through the pressure regulator (26) to the application, it will take a longer period of time for the pressure within the reaction vessel (1) and the condenser (24) to reach the pre-determined pressure level. Because of this time extension, other factors occur which must be taken into consideration.

The reaction that results in the dissociation of water, releasing the hydrogen gas, is exothermic in nature. As a result of the heat generated, the temperature of the concentrated sodium hydroxide solution increases. As the temperature of the solution increases, the reaction occurs at a more rapid rate, generating more heat and raising the temperature of the solution even higher. At this increased reaction rate, the surface area of aluminum (28) exposed to the higher temperature solution will produce hydrogen gas at a greater rate than is required for the application.

To control this phenomenon, when the temperature sensor (5) detects a predetermined temperature of the solution, solenoid valve (14) is closed and solenoid valves (12) and (15) are opened, allowing the solution in the reaction vessel to be forced by pressure through the external piping (11) into the solution reservoir (13). When the solution level in the reaction vessel (1) reaches the level as sensed by liquid level sensor (7), solenoid valves (12) and (15) are closed and solenoid valve (14) is opened. As a result of this action, a smaller surface area of aluminum (28) is exposed to the concentrated sodium hydroxide solution. However, because of the elevated temperature of the solution, this reduced surface area will produce hydrogen gas at the same rate as the original surface area at a lower temperature.

If the pressure in the reactor takes longer to reach the predetermined level and initiate the cycle described above, and consequently the temperature of the solution continues to increase, the described cycle repeats, forcing the solution in the reaction vessel (1) down to the level of liquid level sensor (8). Again, at this higher temperature, the reduced surface area of aluminum (28) exposed to the concentrated sodium hydroxide solution will generate hydrogen gas at approximately the same volumetric rate as the original surface area at a lower temperature.

Periodically during this process, the pressure in the reaction vessel (1) and the condenser (24) will reach the predetermined level which will result in the solution in the reaction vessel (1) being forced into the solution reservoir (13) as previously described. However, when the pressure in the reaction vessel drops below the predetermined level and solution is allowed to flow back into the reaction vessel (1), the level to which it is allowed to flow as sensed by the liquid level sensors (6,7,8) will be determined by the temperature of the solution as detected by the temperature sensor (5). In this manner, the volume of gas generated per unit of time is controlled by allowing a specific surface area of aluminum (28) to be exposed to the concentrated sodium hydroxide solution dependent on the temperature of the solution.

As this cycle repeats, there will be some cooling of the solution as it moves to and from the solution reservoir. As a result, the input of solution to the reaction vessel (1) will vary between liquid level sensors (6,7,8) dependent on the temperature of the incoming solution.

If the flow of gas to the application is shut off by closing the pressure regulator (26), the pressure within the reactor (1) and condenser (24) will reach the predetermined level. The solution is then forced into the solution reservoir as previously described and the apparatus again becomes dormant. At this point, a specific quantity of hydrogen gas at a specific pressure is available for release through the pressure regulator (26) to the application.

The oxides and hydroxides formed during the reaction drop through the perforations in the perforated plate (3) into the lower plenum area of the reactor (1). This occurs because of the specific gravity of the by-products, and their movement is also facilitated by the movement of the solution during the various back and forth cycles. Some of the by-product will convert to the sodium aluminate and be dissolved into the solution. The remainder, which is not dissolved, will settle in the lower plenum area of the reactor (1) or in the bottom of the solution reservoir (13). This build up of residue remains in a semi-fluidic state and will not interfere with the movement of the solution between the two vessels. As the aluminum plates (28) are consumed during the reaction, they gradually move downward, always resting on the upper surface of the perforated plate (3).

The control scheme described above is applicable to all of the thermo-chemical reactions resulting in the release of hydrogen gas as noted above. Whether the aqueous liquid is water, or, e.g., a solution of alkali metal hydroxides, or mineral acids, and the dissociation initiating material is, e.g., a metal, chemical, or hydride, the control scheme described, properly sized for the application, will result in the delivery of specific volumes of hydrogen gas per unit of time at specific pressures without the input of external power.

As an alternative to the use of metallic aluminum and an aqueous solution of sodium hydroxide, a stoichiometric quantity of powdered aluminum and sodium hydroxide can be thoroughly homogenized, and optionally sintered under pressure and mild heat to form a solid cylinder or block of the mixture. This cylinder or block can be placed into the reaction vessel (1) instead of the illustrated aluminum metal (28), and the concentrated sodium hydroxide solution replaced with water (with the elimination of the chemical container (32)). As the water contacts the cylinder/block the sodium hydroxide will dissolve and immediately react with the aluminum, undergoing the same reaction as previously described. The rate of reaction can be controlled as described above.

Figure 3:
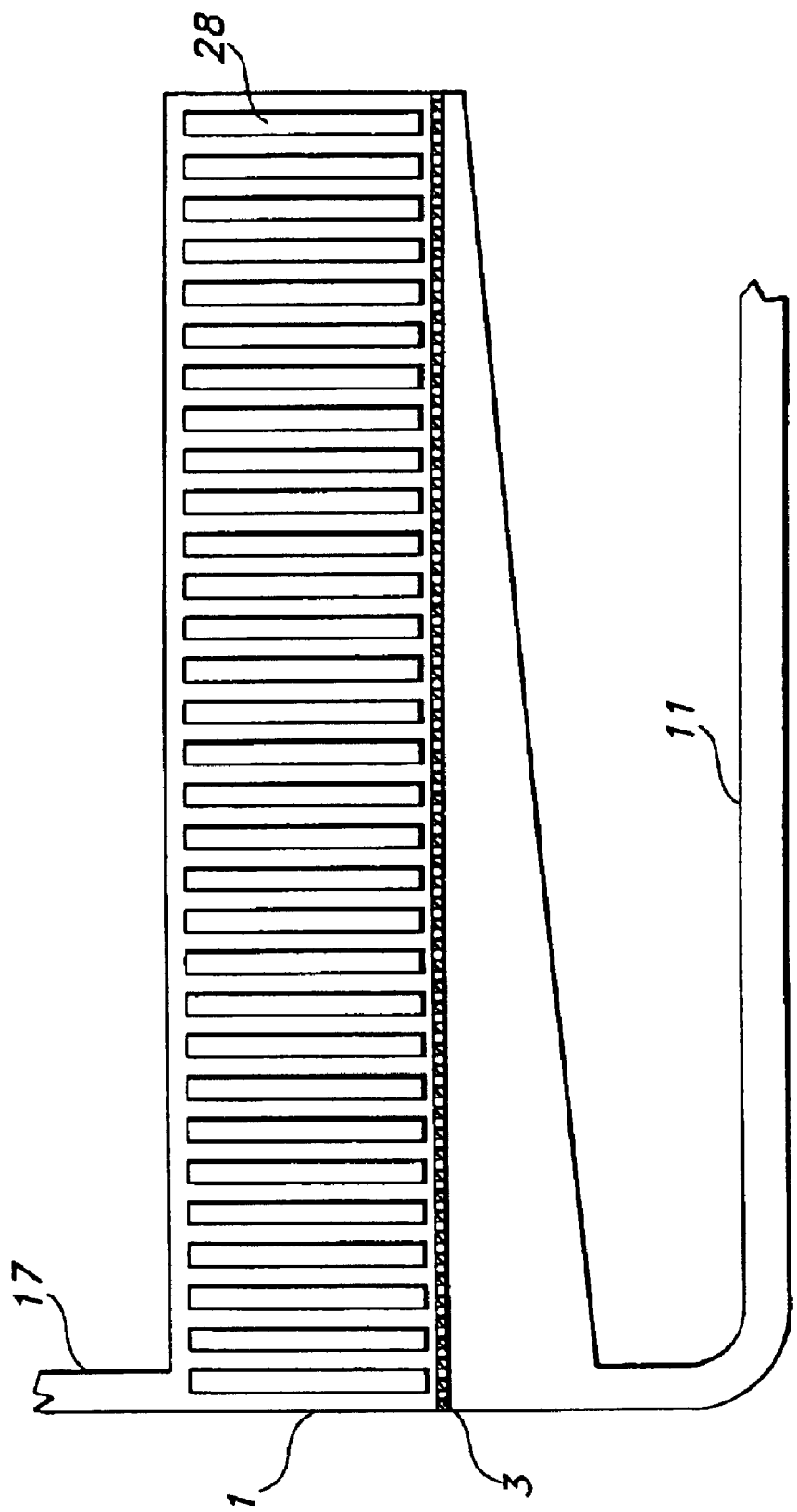
FIG. 3 is a schematic diagram of an alternative embodiment of the invention allowing for a greater surface area of dissociation initiating material in a smaller space.
Figure 4:
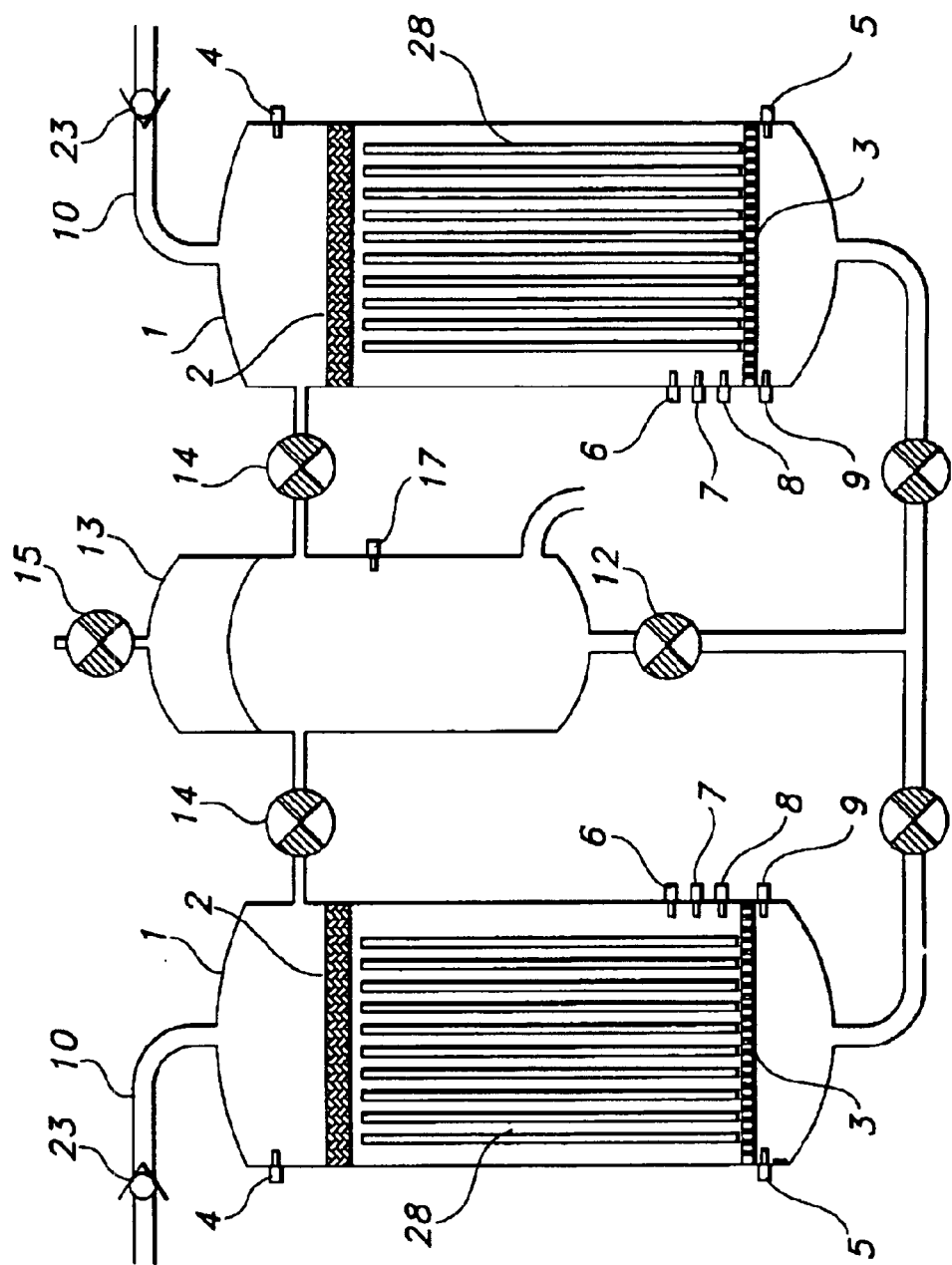
FIG. 4 is a schematic diagram of another alternative embodiment of the invention wherein multiple reactors are arranged in parallel.

As indicated above, although in FIG. 2 and the accompanying description above the components of the apparatus are shown as cylindrical pressure vessels, it will be understood that the various components of the apparatus can be any size and any shape or configuration required to fit a particular application. For example the reactors could be rectangularly shaped as illustrated in FIG. 3 if a greater surface area of aluminum is required in a smaller space (reference numerals in FIG. 3 correspond to those in FIG. 2). Alternatively, two reaction vessels could be installed in parallel as shown in FIG. 4 with the solution alternately being placed into one and then the other. Again, the reference numerals correspond to those used in FIG. 2.

Figure 8:
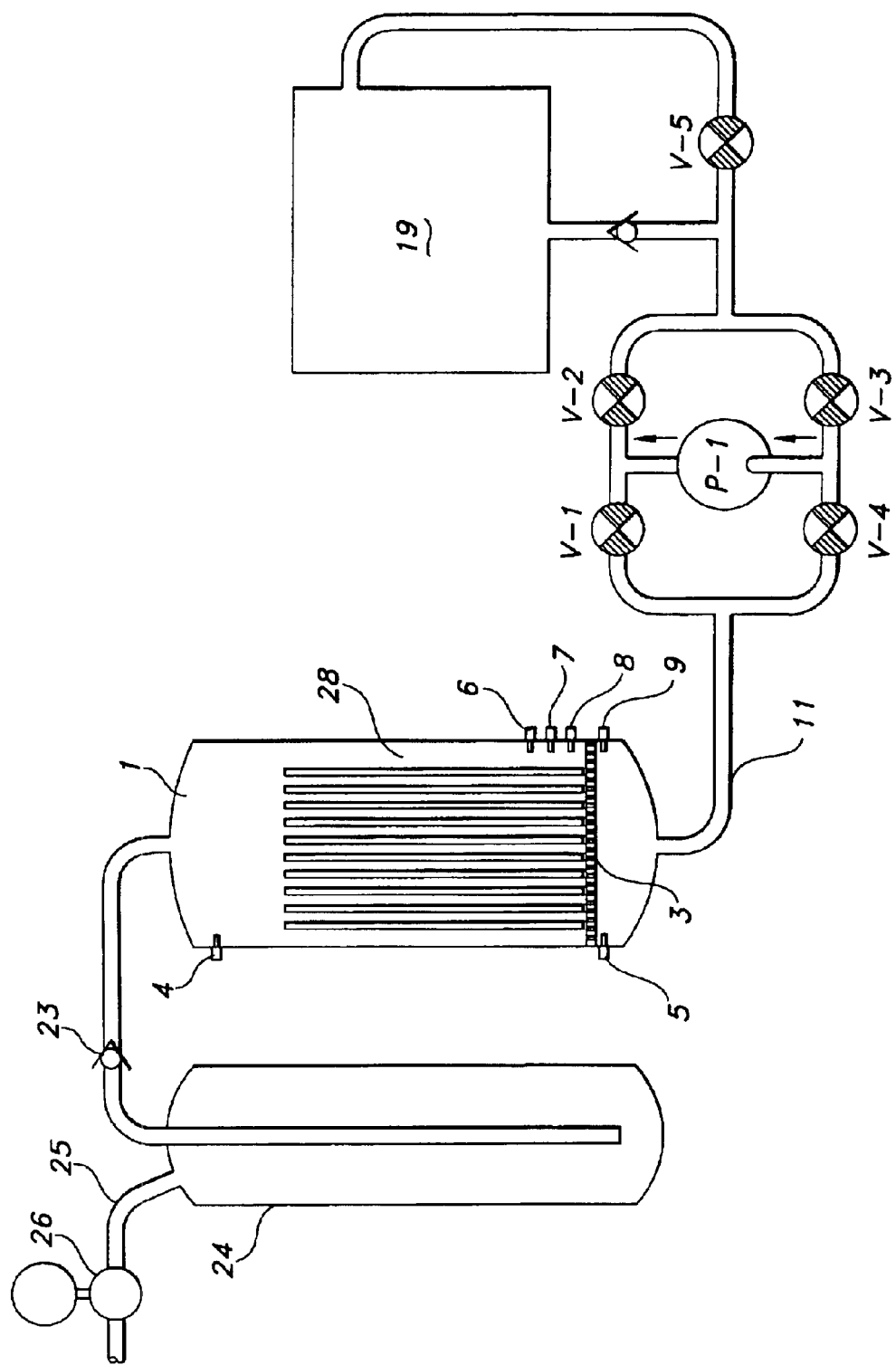
FIG. 8 is a schematic diagram of an embodiment of the invention using pumps to control the liquid level.

It is also understood that though the movement of solution between the reactor and the solution reservoir, in the illustrated case, is occasioned by pressure differentials within the various vessels, the same movement of solution could be accomplished and controlled by the use of external pumps. This embodiment is illustrated schematically in FIG. 8, wherein the reference numerals correspond to those of FIG. 2. In operation the pump (P-1) will move the solution from the solution reservoir (19) into the reactor (1), or from the reactor (1) into the solution reservoir (19). When valves (V-1) and (V-3) are open, and valves (V-2), (V-4) and (V-5) are closed, the pump will pull solution from the solution reservoir (19) and pump it into the reactor (1). When valves (V-1) and (V-3) are closed, and valves (V-2), (V-4) and (V-5) are open, the pump will pull solution from the reactor (1) and pump it into the solution reservoir (19).

Whenever appropriate signals are received from either the pressure transducer (4) or the temperature sensor (5) and the level sensors (6,7,8,9), instead of opening valves which allow the pressure to move the liquid appropriately, the pump (P-1) is turned on and the appropriate valves (V-1, V-2, V-3, V-4, V-5) are opened or closed to allow the appropriate movement of the solution.

The invention having been described by its specific embodiments, those of skill in the art will recognize that various modifications thereof that make use of the same inventive concepts are within the scope of the appended claims or equivalents thereof. For example, any combination of sizes and configurations required to fit a particular application can be utilized under this scheme provided that the mechanical and physical controls delineated can be achieved as specified.

What is claimed is:

1. A method for controlling the dissociation of a flow stream of water into hydrogen and oxygen, comprising:

intermittently introducing a flow stream of an aqueous liquid comprising an aqueous solution of alkali metal hydroxide into a reaction vessel and contacting it therein with a quantity of dissociation initiating material;

monitoring the temperature, or pressure, or both, in the reaction vessel;

monitoring the surfaces area of dissociation initiating material in contact with the aqueous liquid; and controlling the surface area of dissociation initiating material in contact with the aqueous liquid in response to the temperature, or pressure, or both, or in response to changes in temperature or pressure or both, in the reaction vessel by either;

(a) adjusting the level of aqueous liquid in the reaction vessel, (b) varying the rate of introduction of aqueous liquid into the reaction vessel, or (c) forcing aqueous liquid out of the reaction vessel in response to an increase in the pressure in the reactor or a combination of these.

2. The method of claim 1, wherein the monitoring of the surface area of dissociation initiating material in contact with the aqueous liquid comprises monitoring the level of aqueous liquid in the reaction vessel.

3. The method of claim 1, wherein the aqueous liquid is forced out of the reaction vessel by a pressure differential between the reaction vessel and another vessel in fluid communication with the reaction vessel.

4. The method of claim 1, wherein the aqueous liquid is forced out of the reaction vessel by a pump.

5. The method of claim 1, wherein the alkali metal hydroxide is sodium hydroxide.

6. The method of claim 5, wherein the aqueous solution contains sodium hydroxide in a concentration ranging from about 4 M to about 10 M.

7. The method of claim 1, wherein the dissociation initiating material is a metal or metal compound selected from the group consisting of aluminum, alloys of sodium and aluminum, iron, zinc, sodium, and alkali and alkaline earth metal hydrides.

8. The method of claim 7, wherein the dissociation initiating material is aluminum.

9. A method for controlling the dissociation of a flow stream of water into hydrogen and oxygen, comprising:

intermittently introducing a flow stream of an aqueous liquid comprising an aqueous solution of sodium hydroxide into a reaction vessel and contacting it therein with a quantity of dissociation initiating material comprising aluminum;

monitoring the temperature, or pressure, or both, in the reaction vessel;

monitoring the surface area of dissociation initiating material in contact with the aqueous liquid; and controlling the surface area of dissociation initiating material in contact with the aqueous liquid in response to the temperature, or pressure, or both, or in response to changes in temperature or pressure or both, in the reaction vessel by either;

(a) adjusting the level of aqueous liquid in the reaction vessel, (b) varying the rate of introduction of aqueous liquid into the reaction vessel, or (c) forcing aqueous liquid out of the reaction vessel in response to an increase in the pressure in the reactor or a combination of these.

* * * * *